(12) United States Patent
Godard et al.

(10) Patent No.: US 11,100,401 B2
(45) Date of Patent: Aug. 24, 2021

(54) PREDICTING DEPTH FROM IMAGE DATA USING A STATISTICAL MODEL

(71) Applicant: Niantic, Inc., San Francisco, CA (US)

(72) Inventors: Clément Godard, San Francisco, CA (US); Oisin MacAodha, Pasadena, CA (US); Gabriel Brostow, London (GB)

(73) Assignee: Niantic, Inc., San Francisco, CA (US)

( * ) Notice: Subject to any disclaimer, the term of this patent is extended or adjusted under 35 U.S.C. 154(b) by 232 days.

(21) Appl. No.: 16/332,343

(22) PCT Filed: Sep. 12, 2017

(86) PCT No.: PCT/GB2017/052671
§ 371 (c)(1),
(2) Date: Mar. 11, 2019

(87) PCT Pub. No.: WO2018/046964
PCT Pub. Date: Mar. 15, 2018

(65) Prior Publication Data
US 2019/0213481 A1 Jul. 11, 2019

(30) Foreign Application Priority Data
Sep. 12, 2016 (GB) ...................... 1615470

(51) Int. Cl.
| | | |
|---|---|---|
| *G06K 9/00* | (2006.01) | |
| *G06N 3/08* | (2006.01) | |
| *G06T 7/593* | (2017.01) | |
| *G06K 9/62* | (2006.01) | |
| *G06N 3/04* | (2006.01) | |
| *G06F 17/16* | (2006.01) | |
| *G06T 3/40* | (2006.01) | |

(52) U.S. Cl.
CPC ............. *G06N 3/084* (2013.01); *G06F 17/16* (2013.01); *G06K 9/6274* (2013.01);
(Continued)

(58) Field of Classification Search
CPC .... G06N 3/084; G06N 3/0454; G06N 3/0472; G06N 3/02; G06K 9/6274; G06F 17/16; G06T 3/4007; G06T 7/593; G06T 2207/20076; G06T 2207/20084; G06T 2207/20081; G06T 2207/10024;
(Continued)

(56) References Cited

U.S. PATENT DOCUMENTS

2012/0218256 A1 * 8/2012 Murray .................. H04N 5/278
345/419

OTHER PUBLICATIONS

Garg, Ravi, B. G. Vijay Kumar, and Ian Reid. "Unsupervised CNN for Single View Depth Estimation: Geometry to the Rescue." arXiv preprint arXiv: 1603.04992 (Year: 2016).*
(Continued)

*Primary Examiner* — Andrew M Moyer
(74) *Attorney, Agent, or Firm* — Fenwick & West LLP

(57) ABSTRACT

Systems and methods are described for predicting depth from colour image data using a statistical model such as a convolutional neural network (CNN), The model is trained on binocular stereo pairs of images, enabling depth data to be predicted from a single source colour image. The model is trained to predict, for each image of an input binocular stereo pair, corresponding disparity values that enable reconstruction of another image when applied, to the image. The model is updated based on a cost function that enforces consistency between the predicted disparity values for each image in the stereo pair.

20 Claims, 6 Drawing Sheets

(52) U.S. Cl.
CPC ......... *G06N 3/0454* (2013.01); *G06N 3/0472* (2013.01); *G06T 3/4007* (2013.01); *G06T 7/593* (2017.01); *G06T 2207/10012* (2013.01); *G06T 2207/10024* (2013.01); *G06T 2207/20076* (2013.01); *G06T 2207/20081* (2013.01); *G06T 2207/20084* (2013.01)

(58) Field of Classification Search
CPC . G06T 2207/10012; G06T 1/20; G06T 11/00; H04N 2013/0081
USPC .................................................. 382/154–161
See application file for complete search history.

(56) References Cited

OTHER PUBLICATIONS

Zhu, Wenqiao, et al. "Variational stereo matching with left right consistency constraint." 2011 International Conference of Soft Computing and Pattern Recognition (SoCPaR). IEEE (Year: 2011).*

PCT International Search Report and Written Opinion for PCT/GB2017/052671, dated Dec. 6, 2017, 11 Pages.

Search Report issued by Great Britain Intellectual Property Office for Application No. GB 1615470.0, dated Mar. 13, 2017, 3 Pages.

Garg, R., et al: "Unsupervised CNN for Single View Depth Estimation: Geometry to the Rescue" Arxiv.org, Cornell University Library, 201 Olin Library Cornell University Ithaca, NY 14853, Mar. 16, 2016, pp. 1-14.

Gherardi, R., et al: "Optimal Parameter Estimation for MRF Stereo Matching", Jan. 1, 2005, Image Analysis and Processing—ICIAP 2005 Lecture Notes in Computer Science; LNCS, Springer, Berlin, DE, pp. 818-825.

Godard, C., et al: "Unsupervised Monocular Depth Estimation with Left-Right Consistency", Arxiv.org, Cornell University Library, 2010 Lin Library Cornell University Ithaca, NY 14853, Sep. 13, 2016, pp. 1-9.

Xie, J., et al, "Deep3D: Fully Automatic 2d-to-3d Video Conversion with Deep Convolutional Neural Networks" [online], published Apr. 2016, pp. 1-15.

Zhu, W., et al: "Variational stereo matching with left right consistency constraint", Soft Computing and Pattern Recognition (SOCPAR), 2011 International Conference of, IEEE, Oct. 14, 2011, pp. 222-226.

* cited by examiner

PREDICTING DEPTH FROM IMAGE DATA USING A STATISTICAL MODEL

FIELD OF THE INVENTION

This invention relates generally to an image data processing system, and more particularly to prediction of depth data from image data using a trained statistical model.

BACKGROUND

Depth estimation from images has a long history in computer vision. Fruitful approaches have relied on structure from motion, shape from X, binocular, and multi-view stereo. However, most of these techniques rely on the assumption that multiple observations of the scene of interest are available. These observations can come in the form of multiple viewpoints, or observations of the scene under different lighting conditions. To overcome this limitation, there has recently been a surge in the number of works that pose the task of monocular depth estimation, where there is only a single input image, as a supervised learning problem, for example as discussed in L. Ladicky, J. Shi, and M. Pollefeys, "Pulling Things Out Of Perspective", CVPR 2014, D. Eigen, C. Puhrsch, and R. Fergus, "Depth Map Prediction From A Single Image Using A Multi-Scale Deep Network", NIPS 2014, and F. Liu, C. Shen, G. Lin, and I. Reid, "Learning Depth From Single Monocular Images Using Deep Convolutional Neural Fields", PAMI 2015. However, the methods described in such works attempt to directly predict the depth of each pixel in an image using models that have been trained offline on large collections of ground truth depth data. Thus, such methods are restricted to scenes where large image collections and their corresponding pixel depths are available.

An alternative approach that has been developed is to treat automatic depth estimation as an image reconstruction problem during training. Humans perform well at monocular depth estimation by exploiting cues such as perspective, scaling relative to the known size of familiar objects, appearance in the form of lighting and shading, occlusion, among other cues. This combination of both top-down and bottom-up cues appears to link full scene understanding with our ability to accurately estimate depth. Recently, a small number of published works propose deep network based methods for novel view synthesis and depth estimation, which do not require ground truth depth at training time.

J. Flynn, I. Neulander, J. Philbin, and N. Snavely, "DeepStereo: Learning To Predict New Views From The World's Imagery", CVPR 2016, discusses a novel image synthesis network called DeepStereo that generates new views by selecting pixels from nearby neighbouring images. During training, they choose a set of images, compute their respective camera poses (using a combination of odometry and standard structure from motion), and then train a convolutional neural network (CNN) to predict the appearance of a held out nearby image: the most appropriate depths are selected to sample colours from the neighbouring images, based on plane sweep volumes. At test time, image synthesis is performed on small overlapping patches. However, DeepStereo is not suitable for monocular depth estimation as it requires several nearby posed images at test time.

The Deep3D CNN discussed in J. Xie, R. Girshick, and A. Farhadi, "Deep3d: Fully Automatic 2D-To-3D Video Conversion With Deep Convolutional Neural Networks", ECCV 2016 also addresses the problem of novel view synthesis in the training stage, where their goal is to generate the corresponding right view from an input left image (i.e. the source image) in the context of binocular stereo pairs of images. As is well known in computer vision, binocular disparity refers to the difference in coordinates of similar features within two stereo images, i.e. the difference in image location of an object seen by the left and right cameras, resulting from the horizontal separation (parallax) between the cameras. Deep3D uses binocular disparity to extract depth information from the two-dimensional images in stereopsis. Again using an image reconstruction loss, their method produces a distribution over all the possible disparities for each pixel in the input left image. The pixel values of the resulting synthesized right image are a combination of the pixels on the same scan line from the left image, weighted by the probability of each disparity. The disadvantage of their image formation model is that increasing the number of candidate disparity values greatly increases the memory consumption of the algorithm, making it difficult to scale their approach to large output resolutions.

Similar to Deep3D, R. Garg, V. Kumar B G, and I. Reid, "Unsupervised CNN For Single View Depth Estimation: Geometry To The Rescue", ECCV 2016 discusses training a CNN for monocular depth estimation using an image reconstruction loss based on binocular stereo pairs of images in the training stage. However, the image formation model described in Garg et al. is not fully differentiable, making training suboptimal. To compensate, they perform a Taylor approximation to linearize their loss resulting in an objective that is more challenging to optimize.

What is desired is an enhanced network architecture that addresses all of the limitations of the above deep CNN based systems for depth estimation and significantly increases the quality of the final results.

SUMMARY OF THE INVENTION

Aspects of the present invention are set out in the accompanying claims.

According to one aspect, the present invention provides a computer-implemented method comprising storing data defining a statistical model to predict depth data from colour image data; and training the model on at least one input binocular stereo pair of images, by: predicting, for each image of the input binocular stereo pair, corresponding disparity values that enable reconstruction of another image when applied to the image; and updating the model based on a cost function that enforces consistency between the predicted disparity values for each image in the stereo pair.

Training the model may further comprise computing, for each image of the stereo pair, projected disparity values based on the corresponding disparity values. The projected disparity values may be computed for one image of the stereo pair by sampling the predicted disparity values of the first image, and applying the predicted disparity values of the other image to the sampled data. The cost function may include a disparity consistency component to enforce consistency between the predicted disparity values and the projected disparity values computed for each image of the stereo pair.

A reconstruction module of the model may reconstruct the second image in the stereo pair by applying the corresponding predicted disparity values to shift sampled image pixels of the first image in the stereo pair. The cost function may further include a reconstructed appearance matching component to minimize an image reconstruction error between the reconstructed image and the corresponding input image. Sampling may comprise bilinear interpolation.

The cost function may further include a smoothness component to encourage local smoothness in the corresponding predicted disparity values. The cost function may implement a weighted sum of the disparity consistency component, the smoothness component, and the reconstructed appearance matching component The statistical model may comprise a convolutional neural network, CNN, including a structured arrangement of processing nodes, each processing node having at least one parameter value. The convolutional neural network may be trained by back-propagating components of the cost function.

Training the model may further comprise up-sampling and up-convolving the input image data at a plurality of spatial resolutions and predicting corresponding disparity values at each spatial resolution, wherein the model is updated based on a cost function that enforces consistency between the predicted disparity values at each spatial resolution for each image in the stereo pair. The cost function may comprise a weighted enforcement of consistency between the predicted disparity values depending on the spatial resolution.

The binocular stereo pairs of training images may be captured at the same time by respective cameras with a known camera focal length and at a known baseline distance apart. The binocular stereo pairs of training images may be rectified and temporally aligned stereo pairs. The digital images may be annotated with metadata defining attributes of the respective camera that captured the image.

According to yet another aspect, a depth image may be generated from a single input colour image by: generating a predicted disparity map from the input colour image using a disparity prediction module of the trained model; and calculating corresponding estimated depth data from the predicted disparity map. The colour image data may be captured by a camera. The model may be configured to receive large resolution images.

Advantageously, the present invention provides a fully convolutional model that does not require any depth data, and is instead trained to synthesize depth as an intermediate. It learns to predict the pixel level correspondence between pairs of rectified stereo images that have a known camera baseline.

Additionally, embodiments provide:

a network architecture that performs end-to-end unsupervised monocular depth estimation with a novel training loss that incorporates a left-right disparity consistency constraint inside the network;

an evaluation of several different training losses and image formation models highlighting the effectiveness of the described approach; and a model that generalizes to other different datasets.

According to another aspect, the present invention provides an unsupervised deep neural network for monocular depth estimation, where there is only a single input image, and where no assumptions about the scene geometry or types of objects present are made. Instead of using aligned ground truth depth data, which may not be available in particular implementation contexts or may be costly to obtain, the present invention exploits the ease with which binocular stereo data can be captured. According to yet another aspect, the learning module implements a loss function that enforces consistency between the predicted depth maps from each camera view during training, leading to improved predictions. The resulting output depth data is superior to fully supervised baselines, despite the omission of ground truth depth information in the training stage.

Furthermore, the trained model can generalize to datasets not seen during training and still produce visually plausible depth maps.

In other aspects, there are provided apparatus and systems configured to perform the methods as described above. In a further aspect, there is provided a computer program comprising machine readable instructions arranged to cause a programmable device to carry out the methods as described above.

BRIEF DESCRIPTION OF THE DRAWINGS

There now follows, by way of example only, a detailed description of embodiments of the present invention, with references to the figures identified below.

FIG. 3, which comprises

DESCRIPTION OF EMBODIMENTS

Figure 1:
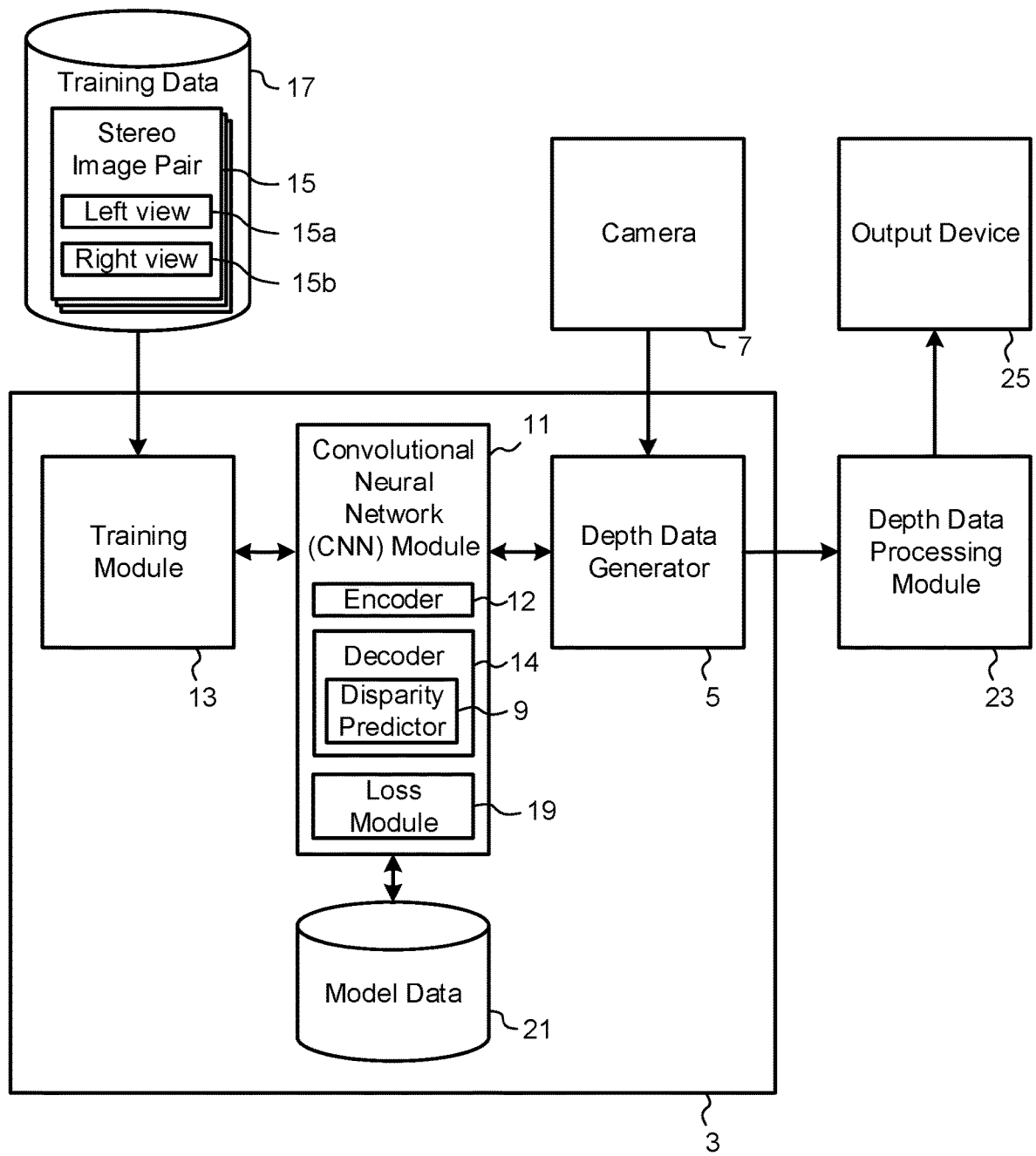
FIG. 1 is a block diagram showing the main components of an image processing system according to an embodiment of the invention.

FIG. 1 is a block diagram of an example system 1 for predicting and processing depth data from colour image data. As illustrated, the system 1 includes an image processing system 3 having a depth data generator module 5 that may receive colour image data captured from a camera 7, such as an RGB image describing RGB values for pixels forming objects in the captured view. The digital images may be annotated with metadata defining attributes of the respective camera that captured the image. The depth data generator module 5 uses a disparity predictor 9 of a trained convolutional neural network (CNN) module 11 to generate a predicted binocular disparity map directly from the received colour image data of the single source image. The generated binocular disparity values are representative of the difference in image location of a detected object or feature in the captured source image and a predicted image location of the object or feature in a corresponding notional binocular stereo view, if the source image was one of a pair of stereo images captured by a calibrated pair of binocular stereo cameras. The depth data generator module 5 computes depth information from the binocular disparity map output by the disparity predictor 9.

The CNN 11 includes a dynamic structured arrangement of processing nodes, each node having a corresponding weight parameter. The structure and weights defining the CNN 11 are updated by a training module 13 during a training stage. In this embodiment, the processing nodes of the CNN 11 are arranged into three main components:

an encoder 12 that includes nodes and layers to: process input image data and output encoded data indicative of objects or features in the input image;

a decoder 14 that includes nodes and layers to: process the encoded data from the encoder 12, perform up-convolution and up-sampling to output scaled data at an increased spatial resolution, output predicted disparity maps, such as the predicted disparity map from input encoded data output by the disparity predictor 9, and output projected views by applying the predicted disparity maps to input image data; and a loss module 19 that includes nodes and layers to: compute a training loss that is used to update the CNN 11, the training loss comprising disparity smoothness and left-right disparity consistency cost terms computed from the disparity maps output by the decoder 14, and an appearance matching cost term computed from comparison of a projected view to the corresponding input view.

As will be described in greater detail below, the training module 13 trains the convolutional neural network (CNN) module 11 based on binocular stereo pairs of images 15, retrieved for example from a database 17 of training images. The binocular stereo pairs of images 15 include a left view 15a and a right view 15b that are captured at the same time by respective binocular stereo cameras with a known camera focal length and at a known baseline distance apart, whereby depth data may be computed from the predicted binocular disparity values output by the disparity predictor 9. The training module 13 optimises a loss function implemented by a loss module 19 of the CNN module 11 and as a result, trains the disparity predictor 9 to accurately and efficiently generate the predicted binocular disparity map directly from colour pixel values of a single source image.

It should be appreciated that the CNN module 11, training module 13, and depth data generator module 5 may be combined into a single module or divided into additional modules, and the image processing module 3 may include additional components, such as a memory 21 to store model data of the trained CNN module 11. The system 1 may also include other components, sub-components, modules, and devices commonly found in a computing system/device, which are not illustrated in FIG. 1 for clarity of the description.

The depth information output by the image processing system 3 may be provided to one or more depth data processing modules 23 for further data processing. The depth data processing modules 23 may be configured to output data and/or control signals to an output device 25 based on the processed depth data. The nature and arrangement of the depth data processing modules will be specific to the implementation context of the system 1. Purely by way of exemplary concrete implementations: the depth maps may be predicted from captured image data relating to synthetic object insertion in computer graphics; determining synthetic depth of field in computational photography; generating control instructions for robotic grasping; outputting depth as a cue in human body pose estimation; determining strong cues for hand pose estimation in human computer interaction; automatic 2D to 3D conversion for film video data; low cost obstacle avoidance sensors for autonomous cars; small form factor, single camera, depth sensing, endoscopes for surgery, single camera 3D reconstruction; improved pose estimation for VR headsets; obstacle avoidance and path mapping for the blind; size and volume estimation for object metrology. It should be appreciated that the training data 17 may comprise stereo image pairs 15 of views specific to the particular implementation context.

Figure 2:
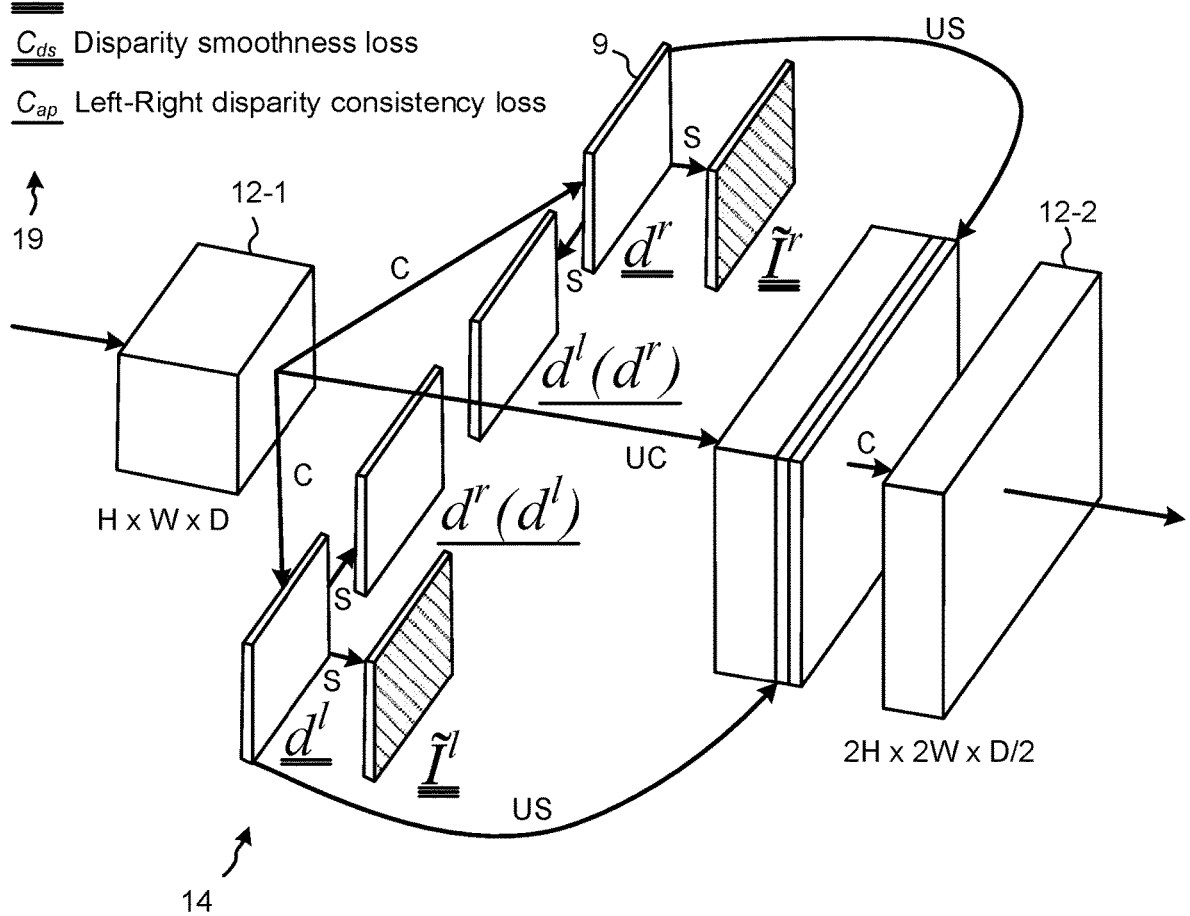
FIG. 2 is a schematic illustration of a section of an exemplary CNN.

FIG. 2 is a schematic illustration of the decoder 14 and training loss module 19 sections of an exemplary CNN according to the present embodiment. The exemplary layers of the CNN 11 are set out in Table 1 below, which is based on the fully convolutional architecture by N. Mayer, E. Ilg, P. Häusser, P. Fischer, D. Cremers, A. Dosovitskiy, and T. Brox, "A Large Dataset To Train Convolutional Networks For Disparity, Optical Flow, And Scene Flow Estimation", CVPR 2016, but adapted to include several modifications that enable the network to be trained without requiring ground truth depth data. In the illustrated example, the CNN consists of 31 million parameters that are learned by the system in the training stage, where 'k' is the kernel size, 's' is the stride, 'channels' is the number of input and output channels of each layer, 'in' and 'out' are the input and output downscaling factor for each layer relative to the input image respectively, and 'input' corresponds to the input of each layer where '+' means concatenation and '*' corresponds to a 2× upsampling of the corresponding layer.

TABLE 1

| | k | s | channels | in | out | Input layer |
|---|---|---|---|---|---|---|
| Encoder layer | | | | | | |
| conv1 | 7 | 2 | 3/32 | 1 | 2 | left |
| conv1b | 7 | 1 | 32/32 | 2 | 2 | conv1 |
| conv2 | 5 | 2 | 32/64 | 2 | 4 | conv1b |
| conv2b | 5 | 1 | 64/64 | 4 | 4 | conv2 |
| conv3 | 3 | 2 | 64/128 | 4 | 8 | conv2b |
| conv3b | 3 | 1 | 128/128 | 8 | 8 | conv3 |
| conv4 | 3 | 2 | 128/256 | 8 | 16 | conv3b |
| conv4b | 3 | 1 | 256/256 | 16 | 16 | conv4 |
| conv5 | 3 | 2 | 256/512 | 16 | 32 | conv4b |
| conv5b | 3 | 1 | 512/512 | 32 | 32 | conv5 |
| conv6 | 3 | 2 | 512/512 | 32 | 64 | conv5b |
| conv6b | 3 | 1 | 512/512 | 64 | 64 | conv6 |
| conv7 | 3 | 2 | 512/512 | 64 | 128 | conv6b |
| conv7b | 3 | 1 | 512/512 | 128 | 128 | conv7 |
| Decoder layer | | | | | | |
| upconv7 | 3 | 2 | 512/512 | 128 | 64 | conv7b |
| iconv7 | 3 | 1 | 1024/512 | 64 | 64 | upconv7 + conv6 |
| upconv6 | 3 | 2 | 512/512 | 64 | 32 | iconv7 |
| iconv6 | 3 | 1 | 1024/512 | 32 | 32 | upconv6 + conv5 |
| upconv5 | 3 | 2 | 512/256 | 32 | 16 | iconv6 |
| iconv5 | 3 | 1 | 512/256 | 16 | 16 | upconv5 + conv4 |
| upconv4 | 3 | 2 | 256/128 | 16 | 8 | iconv5 |
| iconv4 | 3 | 1 | 128/128 | 8 | 8 | upconv4 + conv3 |
| disp4 | 3 | 1 | 128/2 | 8 | 8 | iconv4 |
| upconv3 | 3 | 2 | 128/64 | 8 | 4 | iconv4 |
| iconv3 | 3 | 1 | 66/64 | 4 | 4 | upconv3 + conv2 + disp4* |
| disp3 | 3 | 1 | 64/2 | 4 | 4 | iconv3 |
| upconv2 | 3 | 2 | 64/32 | 4 | 2 | iconv3 |
| iconv2 | 3 | 1 | 34/32 | 2 | 2 | upconv2 + conv1 + disp3* |
| disp2 | 3 | 1 | 32/2 | 2 | 2 | iconv2 |
| upconv1 | 3 | 2 | 32/16 | 2 | 1 | iconv2 |
| iconv1 | 3 | 1 | 18/16 | 1 | 1 | upconv1 + disp2* |
| disp1 | 3 | 1 | 16/2 | 1 | 1 | iconv1 |

As shown, the CNN 11 includes the encoder 12 (comprising layers conv1 to conv7b) and decoder 14 (comprising layers from upconv7 to disp1). The decoder 14 may implement skip connections, as is known in the art, from the encoder's activation blocks, in order to resolve higher resolution details. In FIG. 2, C refers to a Convolution connection, UC to an Up-Convolution connection, S to a Bi-linear Sampling connection, and US to an Up-Sampling connection. In the present exemplary embodiment, disparity predictions are output at four different scales (labelled disp4 to disp1), which increase in spatial resolution at each of the subsequent scales. When training the network, two disparity maps are predicted for each input image view (e.g. the left and the right views), at each of the output scales, as indicated by the subscript s. One disparity map is aligned with the input to the layer (e.g. a left-to-right disparity map, $d^r$, which is aligned to the encoded data of the left view), and the other disparity map is aligned to its corresponding stereo partner (e.g. a projected right-to-left disparity map, $d^l(d^r)$, which is aligned to a corresponding projected right view). The processing by the decoder 14 and the loss module 19 is repeated at each of the four different output scales.

A key advantage is that the trained system 3 produces superior depth maps by predicting the disparity from both binocular cameras and enforcing them to be consistent with each other. Generating the right view with pixels from the left view leads to a disparity map aligned with the right view (and vice versa). The training module 13 aims to optimise the alignment of the predicted disparity map to a source input image (in this embodiment, the left view 15a). During training, the training module 13 has access to both the left and right stereo images 15a,15b and the training module 13 trains the CNN 11 to estimate both left-to-right and right-to-left disparity maps, as well as to determine corresponding projected right-to-left and left-to-right disparity maps from the respective estimated disparity maps, and to enforce consistency therebetween. An additional optimisation goal of the training module 13 is to train the CNN 11 to reconstruct the corresponding left and right views by learning the disparity maps that can shift the pixels to minimize an image reconstruction error. In this way, given training images from a calibrated pair of binocular cameras, the image processing system 3 learns a function that is able to reconstruct an image given the other view, and in so doing, generates a trained model (i.e. the CNN 11) that enables prediction or estimation of the shape of the scene that is being imaged. Given a single training image I (e.g. the left view 15a of a training stereo image pair 15), the image processing system 3 also learns a function that can predict the per-pixel scene depth, $\hat{d}=f(I)$, treating depth estimation as an image reconstruction problem during training.

An overview description has been given above of the components forming part of the image processing system 3 of an embodiment. A more detailed description of the operation of these components will now be given with reference to the flow diagram of FIG. 3, for the process of training a single image depth prediction CNN 11 according to an embodiment, which enables the CNN 11 to be trained solely on stereo image pairs, without requiring supervision for example in the form of corresponding ground truth depth information. While the various steps in this flowchart are presented and described sequentially, it should be appreciated that some or all of the steps may be executed in different orders, may be combined or omitted, and some or all of the steps may be executed in parallel. Further, in one or more of the example embodiments, one or more of the steps described below may be omitted, repeated, and/or performed in a different order.

Figure 4:
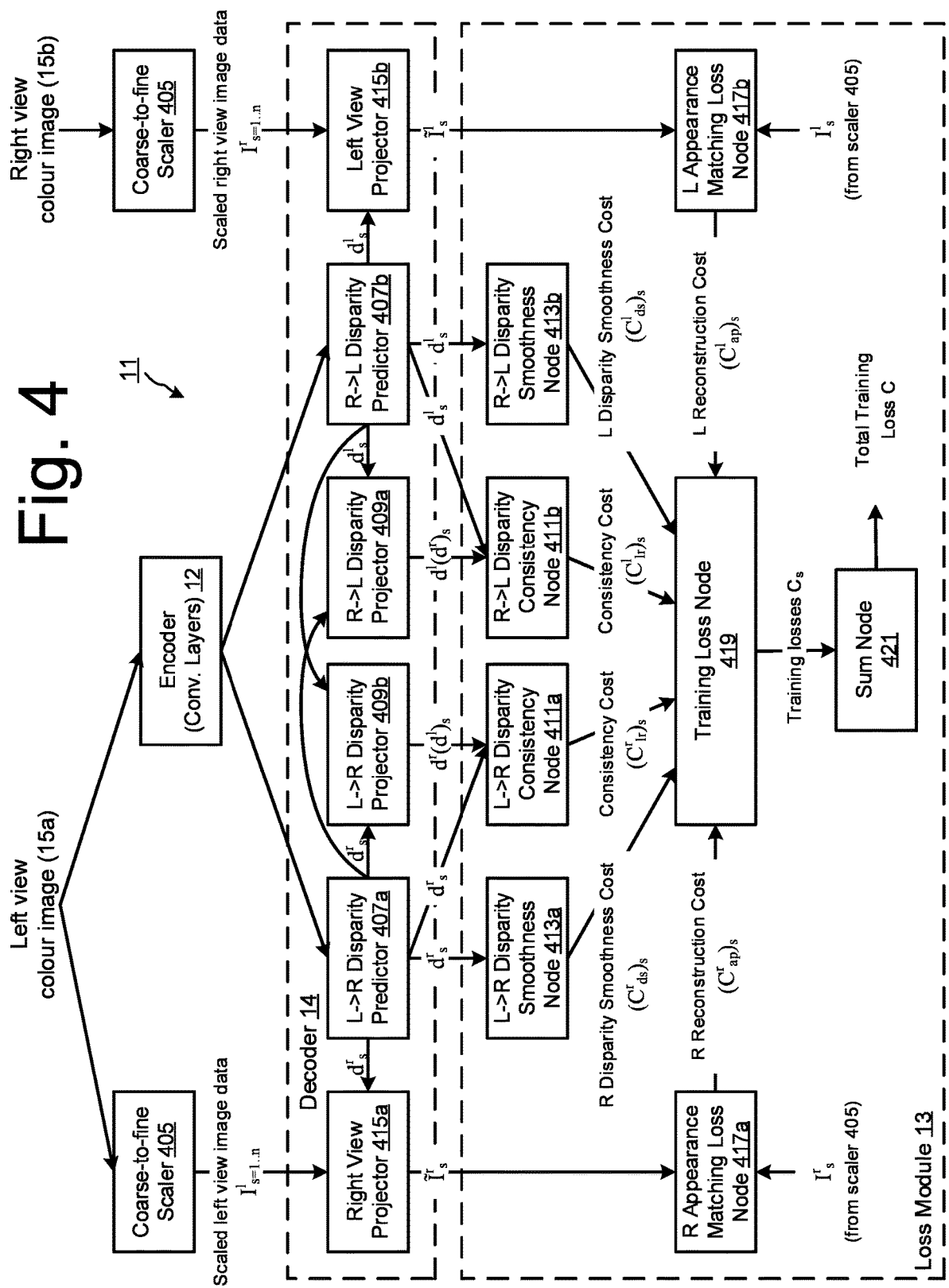
FIG. 4 is a block flow diagram schematically illustrating processing and data components of an example CNN in a training iteration, according to an embodiment.

Reference is also made to FIG. 4, which is a block flow diagram schematically illustrating an example structured arrangement of processing nodes and layers of the CNN 11, according to embodiments of the present invention. The up-convolution (UC) and up-sampling (US) layers, as shown in FIG. 2, are omitted from FIG. 4 for brevity but it should be appreciated that the scaled outputs from the UC and US layers are represented by the subscript s to each of the predicted disparities and the respective calculated cost elements.

Figure 3A:
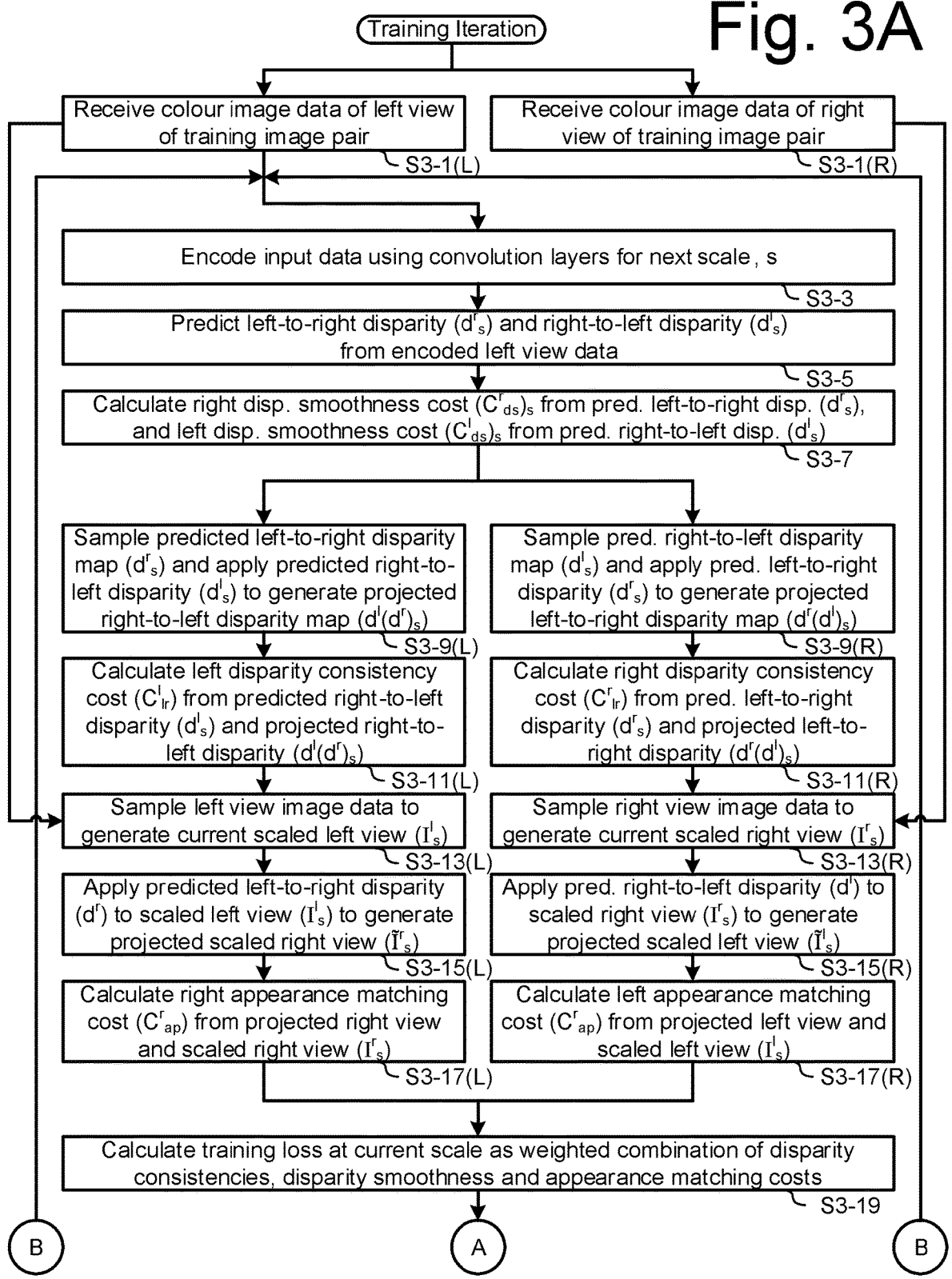
FIGS. 3A and 3B, is a flow diagram illustrating the main processing steps performed by the training module to train a single image depth prediction CNN, according to an embodiment.
Figure 3B:
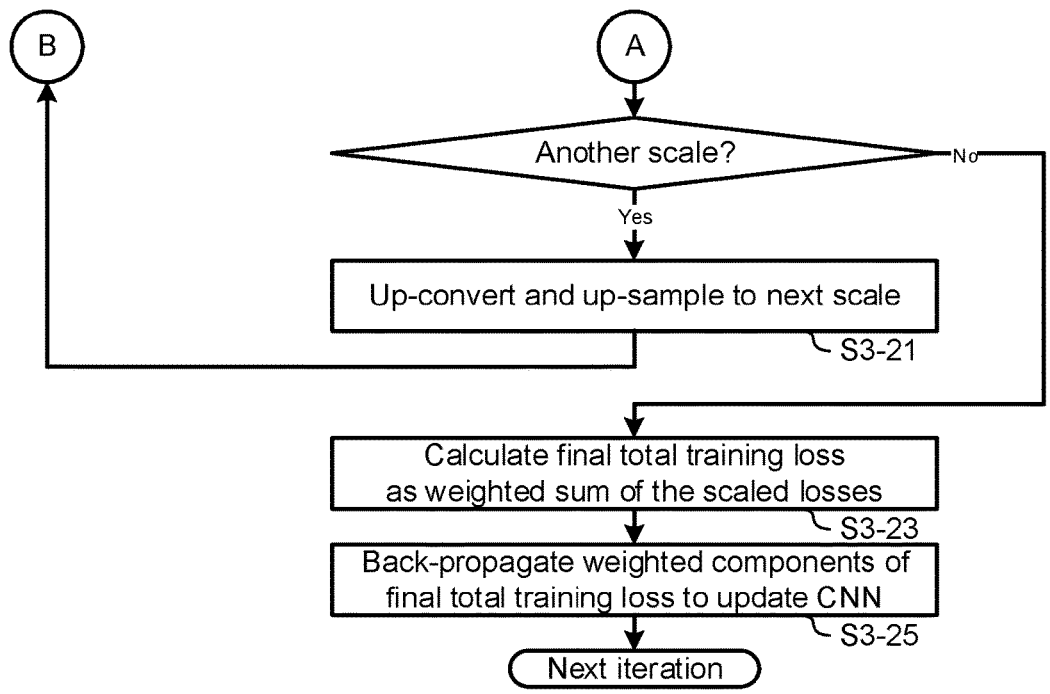
Figure 5:
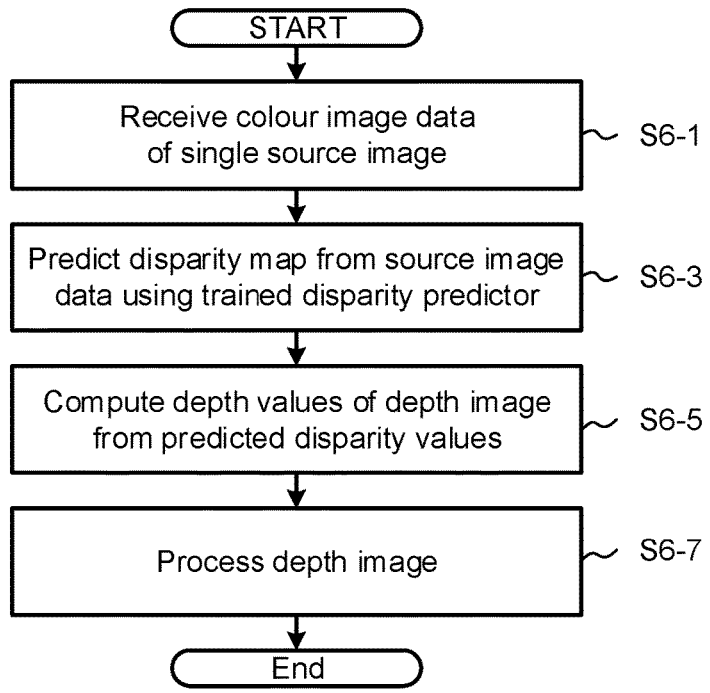
FIG. 5 is a flow diagram for an exemplary process of generating and processing depth data from a single source image using the trained CNN according to an embodiment.

As shown in FIG. 3, an iteration of the training process for a single pair of training images 15 begins at step S3-1(L) where the CNN 11 receives colour image data of views one of the input stereo pair, the left view in this embodiment. In this embodiment, the CNN 11 also receives colour image data of the right view, at step S3-1(R). The training module 13 may retrieve the two images $I^l$ and $I^r$ from training data stored in memory 17, corresponding to the left and right colour images of a calibrated stereo pair, captured at the same moment in time, and pass the image data to one or more input nodes (not shown) of the CNN 11. It should be appreciated that the CNN 11 may be configured to advantageously receive and process a plurality of pairs of training images in parallel. Preferably, although not necessarily, the stereo pair of images 15 are rectified, whereby the images are projected onto a common image plane using a defined transformation process, as is known in the art.

At step S3-3, the input image data of the left view is passed through the convolutional layers of the encoder 12 to generate encoded input data, for example representing a complex feature vector of identified objects or features in the input image. Instead of trying to directly predict the depth from the left view image 15a, the CNN 11 is trained to find a correspondence field, which in this embodiment is the predicted left-to-right disparity map ($d^r$), that when applied to the left view image 15a enables a right view projector 415a of the CNN 11 to reconstruct a projected right view image (or vice versa). Accordingly, at step S3-5, the encoded data output at step S3-3 is passed through the processing nodes of the left view disparity predictor 307a, which outputs data values of a predicted left-to-right disparity map ($d^r_s$) based on the current structure and weights. As will be described below, the CNN 11 is trained to predict a disparity map from input data by predicting, for each image of the input binocular stereo pair, corresponding disparity values, and updating the CNN 11 based on a cost function that enforces consistency between the predicted disparity values for each image in the stereo pair. Accordingly, at step S3-5, the encoded data is also passed through the processing nodes of the right view disparity predictor 307b, which outputs data values of a predicted right-to-left disparity map ($d^l_s$) based on the current structure and weights.

Optionally, a left-to-right disparity smoothness cost ($C^r_{ds}$)$_s$ may be calculated from the predicted left-to-right disparity map ($d^r$) by a L→R disparity smoothness node 413a of the loss module 13, at step S3-7. Likewise, a right-to-left disparity smoothness cost ($C^l_{ds}$)$_s$ may be calculated from the predicted right-to-left disparity map ($d^l$) by a R→L disparity smoothness node 413b of the loss module 13, at step S3-7. The calculated smoothness cost elements of the training loss function encourage the respective predicted disparity maps to be locally smooth with an L1 penalty on the disparity gradients ∂d. For example, the smoothness cost calculated from the predicted left disparity map $d^l$ may be formulated as:

$$C^l_{ds} = \frac{1}{N} \sum\nolimits_{i,j} |\partial_x d^l_{ij}| e^{-\eta \|\partial_x I^l_{ij}\|} + |\partial_y d^l_{ij}| e^{-\eta \|\partial_y I^l_{ij}\|} \qquad (1)$$

where η may be set to 1.0. As depth discontinuities often occur at image gradients, this smoothness cost may be weighted with an edge aware term using the corresponding image gradients ∂I.

At step S3-9(L), a R→L disparity projector 409a samples the data values of the predicted left-to-right disparity map ($d^r_s$), and applies the predicted right-to-left disparity map ($d^r_s$) to the sampled data to generate a projected right-to-left disparity map ($d_t(d^r)_s$). For clarity, processing of the predicted left-to-right disparity values will be described with reference to steps denoted with an (L) and it should be appreciated that the correspondingly numbered processing steps are mirrored for the right-to-left disparity values, as denoted with an (R). In this embodiment, the disparity projectors 409 implement image sampling functionality to sample input data using a disparity map, based on the image sampler from a spatial transformer network (STN), as is known in the art for example from M. Jaderberg, K. Simonyan, A. Zisserman, and K. Kavukcuoglu, "Spatial Transformer Networks", NIPS 2015. The STN uses bilinear sampling where the output pixel is the weighted sum of four input pixels. In contrast to the above-mentioned approaches by Xie et al. and Garg et al., the bilinear sampler used in this embodiment is locally fully differentiable and integrates seamlessly into the fully convolutional architecture of the CNN 11. This means that the CNN 11 does not require any simplification or approximation of the optimisation cost function.

To produce more robust results, the CNN 11 is trained to predict both the left and right image disparities, based only on the left view image data 15a as input to the convolutional loss module 13 part of the network. Accordingly, at step S3-9(L), the projected right disparity predictor node 409a of the CNN 11 outputs a projected right disparity map ($d^l(d^r)$), based on the predicted left disparity map ($d^l$) output by the left view disparity predictor node 407a at step S3-5(L). To ensure coherence, the loss module 13 includes an L1 left-right disparity consistency penalty as part of the model 11. This cost is provided to drive the predicted left-view disparity map ($d^l$) to be equal to the projected right-view disparity map ($d^r(d^l)$). Thus, at step S3-11(L), a L-R disparity consistency loss node 411a calculates a left consistency cost as:

$$C^l_{lr} = \frac{1}{N} \sum_{i,j} \left| d^l_{ij} - d^r_{ij+d^l_{ij}} \right| \quad (2)$$

At step S3-13(L), a coarse-to-fine scaler 405a of the CNN 11 generates and outputs scaled image data of the left view, at scales s, to s, where n=4 in the present exemplary embodiment. For each scale s, the corresponding scaled image data of the left view ($I^l_s$) is passed to a right view projector 415a of the decoder 14 for processing. At step S3-15(L), the right view projector 415a generates the projected neighbouring stereo image by sampling pixels from the scaled left view image ($I^l_s$). In this embodiment, the view projectors 415 also implement the image sampler from a spatial transformer network (STN) as discussed above, to sample the input data using an input disparity map.

Optionally, a right view projector 415a of the CNN 11 may reconstruct a projected right view image by applying the predicted left-to-right disparity ($d^r$) to the input scaled left view image data ($I^l_s$), at step S3-15(L). This process can be formulated as:

$$\arg\min_{d_r} \|I^r - I^l(d^r)\| \quad (3)$$

where d corresponds to the image disparity, a scalar value per pixel that the model 11 is trained to predict. The reconstructed image $I^l(d^r)$ will be referred to as $\tilde{I}^r$ for brevity. A projected left view image may be similarly generated by applying the predicted right-to-left disparity map ($d^l$) to the input scaled right view image data ($I^r_s$), at steps S3-13(R) and S3-15(R).

At step S3-17(L), an appearance matching cost may be calculated by an R appearance matching loss node 417a, as a combination of an LA and single scale Structured Similarity, SSIM, term as the photometric, image reconstruction cost between the input image $I^l_{ij}$ and its reconstruction $\tilde{I}^l_{ij}$:

$$C^l_{ap} = \frac{1}{N} \sum_{i,j} \alpha \frac{1 - SSIM(I^l_{ij}, \tilde{I}^l_{ij})}{2} + (1-\alpha)\|I^l_{ij} - \tilde{I}^l_{ij}\| \quad (4)$$

where N is the number of pixels in the images. In an exemplary embodiment, a simplified SSIM with a 3×3 block filter is used, instead of a Gaussian, and α is set as 0.85. Computation of the SSIM term is known in the art per se, for example from Z. Wang, A. C. Bovik, H. R. Sheikh, and E. P. Simoncelli, "Image Quality Assessment: From Error Visibility To Structural Similarity", Transactions on Image Processing 2004, and need not be described further. The left appearance matching cost ($C^l_{ap}$) may be similarly calculated from a projected left view output by the left view projector 415b and the corresponding scaled left view image output by the scaler 405, at step S3-17(R).

Having passed the left view colour image 15a and the right view colour image 15b through the CNN 11, a training loss node 419 of the loss module 13 computes a training loss for the stereo pair of training images at the current scale, at step S3-19. In the present embodiment, the scaled training loss is calculated as a weighted combination of the disparity smoothness costs output at steps S3-7(L) and (R), the disparity consistency costs output at steps S3-11(L) and (R), and the appearance matching costs output at steps S3-17(L) and (R). This weighted combination of the three calculated cost terms can be formulated as:

$$C_s = \alpha_{ap}(C^l_{ap} + C^r_{ap}) + \alpha_{ds}(C^l_{ds} + C^r_{ds}) + \alpha_{lr}(C^l_{lr} + C^r_{lr}) \quad (5)$$

where $C_{ap}$ encourages the reconstructed image to be similar to the corresponding training input, $C_{ds}$ enforces smooth disparities, and $C_{lr}$ attempts to make the predicted disparities from the left and right images consistent. Each of the main terms contains both a left and right image variant. In this exemplary embodiment involving all three training cost elements, the left view image 15a is always passed through the CNN 11. Since the training module 13 has access to the corresponding right view image 15b during training, the CNN 11 can also predict a disparity map in its frame of reference. It should be appreciated that the right view image data need not be passed through the CNN 11 when the appearance matching cost elements are not implemented.

At step S3-21, the decoder 14 of the CNN 11 performs up-convolution of the data output by the encoder 12 at the current scale, as well as up-sampling of the predicted disparity maps output by the disparity predictors 407, as input to a subsequent structured set of processing nodes to compute a scaled training loss for the next scale, as discussed from steps S3-3 above. After a scaled training loss is computed for each predefined scale, a final total loss is calculated by a sum node 421 of the loss module 13 at step S3-23, as a weighted sum of the individual scaled losses $C_s$:

$$C = \sum_{s=1}^{4} \lambda_s C_s \quad (6)$$

where $\lambda_s$ allows the training module 13 to be configured to weight the relative importance of different output scales during training.

In an exemplary embodiment, the weighting of the different loss components is set to $\alpha_{ap}=1$ and $\alpha_{lr}=1$. The possible output disparities are constrained to be between 0 and $d_{max}$ using a scaled sigmoid non-linearity, where $d_{max}=0.3$ times the image width at a given output scale. As a result of the multi-scale output, the typical disparity of neighbouring pixels will differ by a factor of two between each scale (as the CNN 11 is up-sampling the output by a factor of two). To correct for this, the training module 13 may scale the disparity smoothness term a with r for each scale, to get equivalent smoothing at each level. Thus $\alpha_{ds}=0.1/r$, where r is the downscaling factor of the corresponding layer with respect to the resolution of the input image that is passed into the CNN 11 (in from Table 1).

At step S3-25, the training module 13 updates the CNN 11 by back-propagating the weighted components of the final total training loss computed by the sum node 421 at step S3-21. For the non-linearities in the CNN 11, exponential linear units may be used instead of the commonly used rectified liner units (ReLU), as are both known in the art. In an exemplary embodiment, the CNN 11 is trained from scratch for 50 epochs, based on the technique described in D. Kingma and J. Ba, "Adam: A method for stochastic optimization", arXiv preprint, arXiv:1412.6980, 2014, where $\beta_1=0.9$, $\beta_2=0.999$, and $\varepsilon=10^{-8}$. An initial learning rate of $\lambda=10^{-4}$ is used, which is kept constant for the first 30 epochs before halving it every 10 epochs until the end. It should be appreciated that the training module 13 may be configured to update the CNN 11 using a progressive update schedule, where lower resolution image scales are optimized first. However, the inventors have realised that optimizing all four scales at once further advantageously leads to more stable convergence. Similarly, an identical weighting of each scale loss can be used in the event that different weightings leads to unstable convergence.

Figure 6:
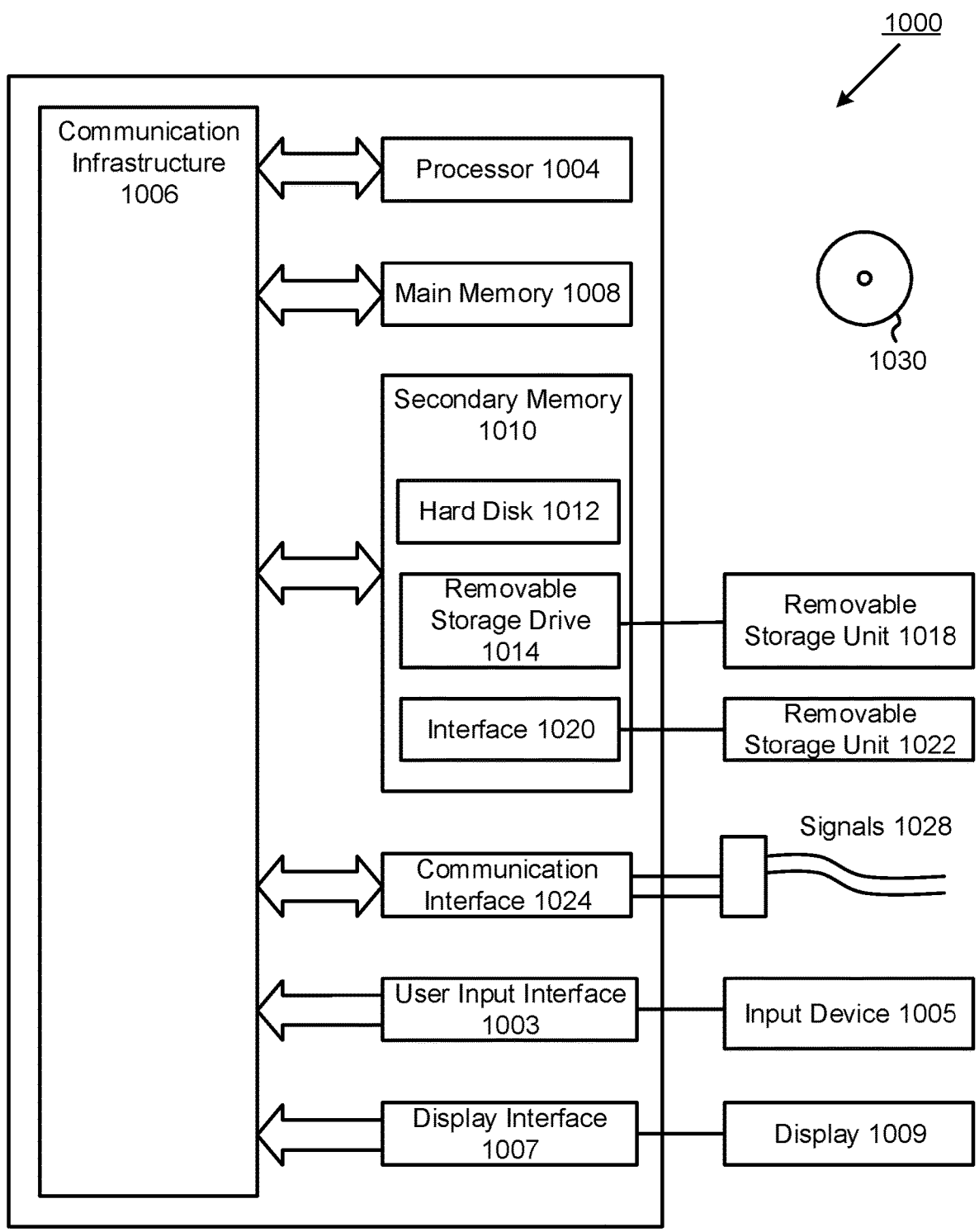
FIG. 6 is a diagram of an example of a computer system on which one or more of the functions of the embodiments may be implemented.

FIG. 6 is a flow diagram for an exemplary process of generating and processing depth data from a single source image using the trained CNN 11 according to an embodiment. At step S6-1, colour image data of a single source image is received by the depth data generator 5, for example from the camera 7. At step S6-3, using a single forward pass through the trained CNN 11, the disparity at the finest scale level for the left image, $d^r$, is output by the trained L-R view disparity predictor 407a as the predicted disparity map (corresponding to disp1 from Table 1). As a result of the upsampling by the coarse-to-fine scaler 405 in the CNN 11, the output predicted disparity map is the same resolution as the input image. It should be appreciated that the right-to-left disparity, $d^l$, is not used in the depth data generation stage.

At step S6-5, the depth data generator 5 creates a depth image consisting predicted depth values for each pixel in the source image, computed from the predicted disparity map output at step S6-3. Given the baseline distance, b, between the stereo cameras used to capture the training data 15, and the associated camera focal length, f, the depth data generator 5 can recover the estimated depth values from the predicted disparity, as:

$$\hat{d} = b\frac{f}{d} \quad (7)$$

At step S6-7, the depth image is passed to a depth data processing module 23 to be processed depending on the specific implementation context of the system 1.

Computer Systems

The entities described herein, such as the image processing system 3 and/or the individual modules of the image processing system 3, may be implemented by computer systems such as computer system 1000 as shown in FIG. 6. Embodiments of the present invention may be implemented as programmable code for execution by such computer systems 1000. After reading this description, it will become apparent to a person skilled in the art how to implement the invention using other computer systems and/or computer architectures.

Computer system 1000, which may be a personal computer, a laptop, a computing terminal, a smart phone, a tablet computer, or the like, includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a user input interface 1003 connected to one or more input device(s) 1005 and a display interface 1007 connected to one or more display(s) 1009. Input devices 1005 may include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using mobile electronic devices with integrated input and display components.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCM-CIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples.

Alternative embodiments may be implemented as control logic in hardware, firmware, or software or any combination thereof. For example, the trained CNN module 11 may be implemented in hardware and/or software as a standalone entity for installation as a component in an image processing system, and may further include the training module functionality and/or the depth data generator functionality.

It will be understood that embodiments of the present invention are described herein by way of example only, and that various changes and modifications may be made without departing from the scope of the invention. For example, the above embodiments implement the trained statistical model as a deep convolutional neural network. As those skilled in the art will appreciate, the underlying aspects of the training process may be applicable to other forms of statistical models suitable for processing image data to generate a predicted depth map, such as random forest and derivatives.

Reference in this specification to "one embodiment" are not necessarily all referring to the same embodiment, nor are separate or alternative embodiments mutually exclusive of other embodiments. In particular, it will be appreciated that aspects of the above discussed embodiments can be combined to form further embodiments. Similarly, various features are described which may be exhibited by some embodiments and not by others. Yet further alternative embodiments may be envisaged, which nevertheless fall within the scope of the following claims.

The invention claimed is:

1. A computer-implemented method comprising:
providing a model to predict disparity values from a single input color image,
wherein the model was trained on at least one input binocular stereo pair of images including a left image and a right image by:
predicting, using just one of the right image or the left image, left-to-right right disparity values and right-to-left disparity values, wherein:
the left-to-right disparity values enable reconstruction of a predicted right image when applied to the left image; and
the right-to-left disparity values enable reconstruction of a predicted left image when applied to the right image; and
updating the model based on a cost function that enforces consistency between the predicted left-to-right and right-to-left disparity values;
generating the disparity values from the single input color image using the model; and
calculating estimated depth data corresponding to the single input color image using the disparity values generated from the single input color image.

2. The method of claim 1, wherein the model was further trained by:
computing projected right-to-left disparity values using the predicted left-to-right disparity values and
computing projected left-to-right disparity values using the predicted right-to-left disparity values.

3. The method of claim 2, wherein:
the projected right-to-left disparity values were computed by sampling the predicted left-to-right disparity values, and applying the predicted right-to-left disparity values to the sampled data; and
the projected left-to-right disparity values were computed by sampling the predicted right-to-left disparity values, and applying the predicted left-to-right disparity values to the sampled data.

4. The method of claim 2, wherein the cost function includes a disparity consistency component to enforce consistency between the predicted left-to-right and right-to-left disparity values and the projected left-to-right and right-to-left disparity values.

5. The method of claim 1, wherein training the model further comprises:
reconstructing the right image in the stereo pair by applying the predicted left-to-right disparity values to shift sampled pixels of the left image; and
reconstructing the left image in the stereo pair by applying the predicted right-to-left disparity values to shift sampled pixels of the right image.

6. The method of claim 3, wherein the sampling comprises bilinear interpolation.

7. The method of claim 5, wherein the cost function further includes a reconstructed appearance matching component to minimize respective image reconstruction errors between reconstructions of the predicted left and right images and the left and right images of the stereo pair.

8. The method of claim 7, wherein the cost function further includes a smoothness component to encourage local smoothness in the predicted left-to-right and right-to-left disparity values.

9. The method of claim 8, wherein the cost function implements a weighted sum of the disparity consistency component, the smoothness component, and the reconstructed appearance matching component.

10. The method of claim 1, wherein the model comprises a convolutional neural network including a structured arrangement of processing nodes, each processing node having at least one weight value.

11. The method of claim 10, wherein the convolutional neural network is trained by back-propagating components of the cost function.

12. The method of claim 1, wherein training the model further comprises:
   up-sampling and up-convolving the left and right images of the input binocular stereo pair at a plurality of spatial resolutions; and
   predicting respective left-to-right and right-to-left disparity values at each spatial resolution,
   wherein the model was updated based on a cost function that enforces consistency between the predicted left-to-right and right-to-left disparity values at each spatial resolution.

13. The method of claim 12, wherein the cost function comprises a weighted enforcement of consistency between the predicted left-to-right and right-to-left disparity values depending on the spatial resolution.

14. The method of claim 1, wherein the binocular stereo pairs of images were captured at the same time by respective cameras with a known camera focal length and at a known baseline distance apart, whereby corresponding depth data is computed from the predicted left-to-right and right-to-left disparity values.

15. The method of claim 14, wherein the binocular stereo pairs of images are rectified and temporally aligned stereo pairs.

16. The method of claim 15, wherein the binocular stereo pairs of images are annotated with metadata defining attributes of the respective camera that captured the images.

17. A computer-implemented method comprising:
   storing data defining a model to predict disparity values from a single input color image; and
   training the model on at least one input binocular stereo pair of images including a left image and a right image, by:
      predicting, using just one of the right image or the left image, left-to-right right disparity values and right-to-left disparity values, wherein:
         the left-to-right disparity values enable reconstruction of a predicted right image when applied to the left image; and
         the right-to-left disparity values enable reconstruction of a predicted left image when applied to the right image; and
      updating the model based on a cost function that enforces consistency between the predicted left-to-right and right-to-left disparity values,
   wherein the trained model can be used to generate a depth image from a single input color image by:
      generating the disparity values from the input color image using the trained model; and
      calculating estimated depth data corresponding to the single input color image using the disparity values generated from the single input color image.

18. The method of claim 17, wherein the single input color image data is captured by a camera.

19. A non-transitory computer-readable medium storing instructions that, when executed by a computing device, cause the computing device to perform operations comprising:
   providing a model to predict disparity values from a single input color image,
   wherein the model was trained on at least one input binocular stereo pair of images including a left image and a right image by:
      predicting, using just one of the right image or the left image, left-to-right right disparity values and right-to-left disparity values, wherein:
         the left-to-right disparity values enable reconstruction of a predicted right image when applied to the left image; and
         the right-to-left disparity values enable reconstruction of a predicted left image when applied to the right image; and
      updating the model based on a cost function that enforces consistency between the predicted left-to-right and right-to-left disparity values;
   generating the disparity values from the single input color image using the model; and
   calculating estimated depth data corresponding to the single input color image using the disparity values generated from the single input color image.

20. The non-transitory computer-readable medium of claim 19, wherein the operations further comprise:
   up-sampling and up-convolving the left and right images of the input binocular stereo pair at a plurality of spatial resolutions; and
   predicting respective left-to-right and right-to-left disparity values at each spatial resolution,
   wherein the model was updated based on a cost function that enforces consistency between the predicted left-to-right and right-to-left disparity values at each spatial resolution.

* * * * *